United States Patent
Mehta et al.

(10) Patent No.: US 12,312,440 B2
(45) Date of Patent: May 27, 2025

(54) GLYCOLIC ACID POLYMER

(71) Applicant: SYENSQO SA, Brussels (BE)

(72) Inventors: Ishan Mehta, Mumbai (IN);
Gururajan Padmanaban, Gujarat (IN);
Kanu Barad, Vadodara (IN); Yves Vanderveken, Leuven (BE)

(73) Assignee: SYENSQO SA, Brussels (BE)

(*) Notice: Subject to any disclaimer, the term of this patent is extended or adjusted under 35 U.S.C. 154(b) by 279 days.

(21) Appl. No.: 16/472,850

(22) PCT Filed: Dec. 19, 2017

(86) PCT No.: PCT/EP2017/083638
§ 371 (c)(1),
(2) Date: Jun. 21, 2019

(87) PCT Pub. No.: WO2018/115008
PCT Pub. Date: Jun. 28, 2018

(65) Prior Publication Data
US 2020/0190255 A1    Jun. 18, 2020

(30) Foreign Application Priority Data

Dec. 22, 2016 (IN) .............................. 201621043785

(51) Int. Cl.
*C08G 63/20* (2006.01)
*B32B 27/08* (2006.01)
(Continued)

(52) U.S. Cl.
CPC .............. *C08G 63/60* (2013.01); *B32B 27/08* (2013.01); *B32B 27/36* (2013.01); *C08G 63/80* (2013.01);
(Continued)

(58) Field of Classification Search
CPC ........ C08G 63/60; C08G 63/80; B32B 27/08; B32B 27/36; B32B 2439/60; B32B 2439/66; B32B 2439/70
(Continued)

(56) References Cited

U.S. PATENT DOCUMENTS 4,139,525 A * 2/1979 Bacskai ................ C09J 167/04
560/84
4,156,676 A * 5/1979 Bacskai ................ C09J 167/04
524/600
(Continued)

FOREIGN PATENT DOCUMENTS

WO    2016173640 A1    11/2016

OTHER PUBLICATIONS

Hans R. Kricheldorf Macromol. Symp. 122, 15-23 (1997). (Year: 1997).*
(Continued)

*Primary Examiner* — Ling Siu Cho
*Assistant Examiner* — Ronald Grinsted
(74) *Attorney, Agent, or Firm* — Osha Bergman Watanabe & Burton LLP (57) ABSTRACT

A glycolic acid polymer is obtained from polycondensation reaction of a monomer mixture consisting of: (i) glycolic acid (GA); (ii) optionally, at least one hydroxyl acid having only one hydroxyl group and only one carboxylic acid group different from GA; (iii) at least one polyol comprising at least three hydroxyl groups and being free from carboxylic acid group; (iv) at least one aromatic diacid comprising two aromatic carboxylic acid groups and being free from hydroxyl groups; and (v) optionally at least one carboxylic acid having one carboxylic acid group and being free from hydroxyl group; which has an appropriate rheological profile so as to be used in combination with standard polyester (Continued)

resins for obtaining multi-layer containers having thin barrier layers.

17 Claims, 1 Drawing Sheet

(51) Int. Cl.
*B32B 27/36* (2006.01)
*C08G 63/60* (2006.01)
*C08G 63/80* (2006.01)

(52) U.S. Cl.
CPC ....... *B32B 2439/60* (2013.01); *B32B 2439/66* (2013.01); *B32B 2439/70* (2013.01)

(58) Field of Classification Search
USPC .......................................... 528/272
See application file for complete search history.

(56) References Cited

U.S. PATENT DOCUMENTS

| | | | | |
|---|---|---|---|---|
| 5,206,341 | A | * | 4/1993 | Ibay ........................ A61L 17/12 |
| | | | | 528/271 |
| 5,663,247 | A | * | 9/1997 | Sorensen ............. C08G 83/005 |
| | | | | 424/DIG. 16 |
| 5,914,381 | A | | 6/1999 | Terado et al. |
| 6,114,458 | A | * | 9/2000 | Hawker ............... C08G 83/003 |
| | | | | 525/445 |
| 7,153,587 | B2 | | 12/2006 | Tan et al. |
| 2005/0244538 | A1 | * | 11/2005 | Andersen ............... A23G 4/126 |
| | | | | 426/3 |
| 2005/0288479 | A1 | * | 12/2005 | Kuroda .................. C08G 63/06 |
| | | | | 528/302 |
| 2006/0009611 | A1 | | 1/2006 | Hayes |
| 2012/0027973 | A1 | | 2/2012 | Wautier |
| 2015/0247021 | A1 | * | 9/2015 | Saigusa .................... C08K 3/34 |
| | | | | 524/599 |
| 2016/0168315 | A1 | * | 6/2016 | Hernandez Garcia ...................... |
| | | | | C08G 63/90 |
| | | | | 528/304 |
| 2018/0171072 | A1 | * | 6/2018 | Padmanaban .......... C08G 63/78 |

OTHER PUBLICATIONS

Ying Zhang et al "Synthesis of Hyperbranched Polymers and Prospects for Application in Oilfield Chemistry", Review published: May 31, 2022 (Year: 2022).*

Standard ASTM D4440-08, "Standard Test Method for Plastics: Dynamic Mechanical Properties Melt Rheology", 2008, pp. 1-5.

* cited by examiner

GLYCOLIC ACID POLYMER

CROSS-REFERENCE TO RELATED APPLICATION

This application is a U.S. national stage entry under 35 U.S.C. § 371 of International Application No. PCT/EP2017/083638 filed Dec. 19, 2017, which claims priority to Indian provisional application No. 20/162,1043785 filed on Dec. 22, 2016. The entire contents of these applications are explicitly incorporated herein by this reference.

TECHNICAL FIELD

The present invention pertains to a novel glycolic acid polymer, to a method of making the same, and to a method of making a multi-layer container using the same.

BACKGROUND ART

Today, multi-layer plastic containers mainly made of polyester such as polyethylene terephthalate (PET) and comprising a barrier layer conferring low gas permeability are widely used for beverages, such as tea, fruit juices, carbonated beverages, sodas, and the like. More recently, increased demand for so-called "small" plastic container (e.g. volumes ranging from 150 to 600 ml) is observed: Such reduction in container size inevitably leads to an increase of exposed surface area per unit volume. Hence, as the plastic container becomes smaller in size, the shelf life of contents would become shorter, unless improvements in barrier properties delivered by modifications in the size or the nature of the barrier layer are called for compensating the un-permeability loss. While increase in the thickness of the barrier layer could provide a solution, cost consideration generally drives in the opposite direction, i.e. for a reduction in the thickness of the same. Further, in recent years, plastic containers have been proposed for packaging more "demanding" beverages, such as beer, which is a beverage well known for being affected by oxygen and light, and for which $CO_2$ un-permeability is a must. Accordingly, there is a general demand in the market for additional improvement in gas barrier property of the plastic container. Further, in addition, in the packaging domain, a continuous quest for solutions ensuring recyclability of components' materials and/or biodegradability of the same exists.

In order to deal with all the above-mentioned demands, multi-layer containers combining a thermoplastic polyester resin such as PET as a resin for forming each of an innermost layer and an outermost layer and using a bio-sourced and bio-degradable polyglycolic acid (co)polymers (PGA) barrier layer have been considered.

Generally speaking, techniques used for the manufacture of multi-layer containers mainly made of a polyester resin and including an inner layer of PGA resin, comprise injection or extrusion molding from molten state those two resins simultaneously through a die to fill a mold cavity, molding a preform (parison) structure having at least three layers, and further subjecting the resultant preform to biaxial stretch blow molding so as to obtain the multi-layer container.

Nevertheless, for the above mentioned injection molding step to provide a suitable preform, arranging a thin layer of PGA as barrier layer in a homogeneous manner between two layers of polyester resin, it is important both that there's a match in the viscosity of the two resins, but also in the elastic recovery of the same.

Indeed, applicant has found that technique above detailed, for the manufacture of multi-layer assemblies, would require, from one side, for the co-injected or co-extruded PGA material to possess a dynamic viscosity, when determined at a shear rate at about 10 sec$^{-1}$ (which significantly correspond to the shear which a resin to be co-extruded in inner layer in amount of 1-10% wt will be exposed) consistent with the viscosity of the polyester resin, and from the other side, for the same co-injected or co-extruded PGA material to possess a matching tan δ at same shear rate, where tan δ is the ratio between the viscous modulus and the elastic modulus at same shear rate.

The applicant has found that failure to comply with these viscous and elastic rheological behaviour match requirements between the polyester resin and the PGA resin lead to flow instability phenomena which create unacceptable defects in the barrier layer, and hence provide for containers of unsuitable permeability performances, especially when targeting ever thinner barrier layers.

While techniques providing linear PGA consisting essentially of recurring units [$CH_2$—C(O)—O]— by polycondensation of cyclic glycolide, manufacture of PGA copolymers from direct polycondensation of glycolic acid, in the presence of additional modifying/branching monomers has been proposed as an economical and efficient alternative, providing high molecular weight PGA having advantageous rheological behaviour.

In this area, U.S. Pat. No. 5,914,381 (MITSUI CHEMICALS INC) 22 Jun. 1999 is directed to a degradable polymer which has a structure resulting from combination of a star-shaped polymer comprising a polyfunctional base compound of polycarboxylic acid having three or more carboxyl groups and/or anhydride of the same or aliphatic polyhydric alcohol having three or more hydroxyl groups and a unit of aliphatic hydroxycarboxylic acid, with aliphatic polyhydric alcohol having two or more hydroxyl groups or polycarboxylic acid having two or more carboxyl groups or anhydrides of the same. The aliphatic hydroxycarboxylic acid can be lactic acid, glycolic acid, 3-hydroxybutyric acid, 4-hydroxybutyric acid, 4-hydroxyvaleric acid, 5-hydroxyvaleric acid and 6-hydroxycaproic acid, with lactic acid being preferred. Among polycarboxylic acid having two or more carboxyl groups, is mention made of linear compounds and of cyclic compounds; as examples of these latter, 1,2,3,4,5,6-cyclohexanehexacarboxylic acid, 1,2,3,4-cyclopentanetetracarboxylic acid, tetrahydrofuran-2R, 3T, 4T, 5C-tetracarboxylic acid, 1,2,3,4-cyclobutanetetracarboxylic acid, 4-carboxy-1,1-cyclohexanediacetic acid, 1,3, 5-cyclohexanetricarboxylic acid, 1,3,5-trimethyl-1,3,5-cyclohexanetricarboxylic acid, (1 alpha, 3 alpha, 5 beta)-1,3, 5-trimethyl-1,3,5-cyclohexanetricarboxylic acid and other alicyclic polycarboxylic acids; 2,3,4,5-furantetracarboxylic acid, 2-methyl-3,4,6-pyridinetricarboxylic acid and other heterocyclic polycarboxylic acid; trimellitic acid, pyromellitic acid are mentioned.

Still, U.S. Pat. No. 7,153,587 (MITSUI CHEMICALS INC) 26 Dec. 2006 provides a polyester resin which comprises (a-1) 45 to 99 percent by mole of an oxycarboxylic acid unit having 5 carbon atoms or less, (a-2) 0.5 to 27.5 percent by mole of an aromatic dicarboxylic acid unit, and (a-3) 0.5 to 27.5 percent by mole of a short chain aliphatic diol unit having 4 carbon atoms or less, and containing (a-1) to (a-3) in a total amount of 95 percent by mole or greater, wherein the oxycarboxylic acid is preferably glycolic acid; the aromatic carboxylic acid can be isophthalic acid, phthalic acid, or 2,6-naphthalenedicarboxylic acid; and the short chain aliphatic diol is any of ethylene glycol, diethylene glycol, 1,2-propanediol, 1,3-propanediol, 1,4-butanediol, and wherein the said polyester may additionally comprise units derived from aliphatic dicarboxylic acids, and/or from a monomer having a functionality of 3 or more, e.g. a polyfunctional acid having 3 or more carboxyl groups, a polyfunctional alcohol having 3 or more hydroxyl groups, and hydroxy-acids where the sum of hydroxyl and carboxyl groups exceeds 3. Nevertheless, the PGA provided in this document, because of the presence of a significant amount (exceeding 1% moles) of units derived by sequences of monomers (a-2) and (a-3), i.e. of "standard" polyester type, tend to be deficient in barrier properties, with respect to PGA consisting essentially of glycolic acid units.

Hence, US 2012027973 (SOLVAY S. A.) Feb. 2, 2012 discloses a process for manufacturing a polymer by polycondensation of a hydroxy acid, said polymer comprising at least 80% by weight of units that correspond to the hydroxy acid, according to which at least one polyfunctional reactant capable of giving rise to the formation of a three-dimensional polymer network is mixed with the hydroxy acid, and according to which the mixture is subjected to temperature and pressure conditions and for a duration which are all suitable for giving rise to the formation of the network. Among said polyfunctional reactants, mention is made of epoxy silanes, polyepoxides, and mixtures of at least one polyol and at least one polyacid, of which at least one of (preferably both) the polyol and the polyacid comprise(s) three functionalities.

Still, WO 2016/173640 (SOLVAY S. A.) Mar. 11, 2016 pertains to a branched poly(hydroxyl acid) polymer obtained from polycondensation reaction of a monomer mixture comprising: (i) at least one hydroxyl acid having only one hydroxyl group and only one carboxylic acid group [hydroxyacid (A)]; (ii) at least one polyol comprising at least three hydroxyl groups and being free from carboxylic acid group [polyol (H)]; (iii) at least one polyacid comprising at least three carboxylic acid groups and being free from hydroxyl groups [polyacid (O)]; and (iv) at least one carboxylic acid having one or two carboxylic acid groups and being free from hydroxyl group [acid (C)], wherein the amount of said acid (C) is such that the number of carboxylic acid groups thereof is comprised between 0.0001 to 0.010 percent with respect to the number of hydroxyl groups of hydroxyacid (A).

Nevertheless, the applicant has found that the branched PGA provided by the prior art, as listed above, wherein a combination of three-functional branching agents is used, are characterized by a visco-elastic behaviour which render them unsuitable for being used in combination with standard PET resins for being processed via common techniques for making multi-layer containers. In particular, the Applicant has found that such branched PGA polymers are characterized by an improved thermal stability, a peculiar relation between tan δ (measured at a shear rate of 10 sec$^{-1}$ and at 260° C.) and molten viscosity (equally measured at a shear rate of 10 sec$^{-1}$ and 260° C.), with values of tan δ of more than 1.5 for viscosities increasing from 400 to 800 Paxsec, i.e. representative of a viscous/elastic compromise leading to significant elasticity in the molten state, hence generating melt flow instability in co-extrusion/co-injection molding, and possessing very high shear thinning (ratio between viscosity at 100 sec$^{-1}$ and 1 sec$^{-1}$), which may be inconsistent with shear variations encountered in the different sections of melt processing machineries, in particular when PGA polymers are intended as inner layers.

Now, the applicant has found an improved branched glycolic acid copolymer, which is able to match the above-mentioned rheological requirements, and which can be hence successfully used in combination with standard polyester resins for obtaining multi-layer containers having thin barrier layers.

SUMMARY OF INVENTION

The invention hereby pertains to a glycolic acid polymer [polymer (PGA)], said polymer PGA being obtained from polycondensation reaction of a monomer mixture consisting of:
  (i) glycolic acid (GA);
  (ii) optionally, at least one hydroxyl acid having only one hydroxyl group and only one carboxylic acid group different from GA [hydroxyacid (A)], wherein the molar amount of hydroxyacid (A) is of at most 5% moles, with respect to the sum of moles of GA and hydroxyacid (A);
  (iii) at least one polyol comprising at least three hydroxyl groups and being free from carboxylic acid group [polyol (H)];
  (iv) at least one aromatic diacid comprising two aromatic carboxylic acid groups and being free from hydroxyl groups [diacid (AR)]; and
  (v) optionally at least one carboxylic acid having one carboxylic acid group and being free from hydroxyl group [monoacid (C)],
wherein:
  the amount of polyol (H) is such that the number of hydroxyl groups thereof is comprised between 0.050 to 0.750% with respect to the overall number of carboxyl groups of glycolic acid and the hydroxyacid (A), if present;
  the amount of diacid (AR) is such that the number of carboxylic acid groups thereof is comprised between 0.050 to 0.750% with respect to the overall number of hydroxyl groups of glycolic acid and of the hydroxyacid (A), if present;
  the amount of said monoacid (C), when present, is such that the number of carboxylic acid groups thereof is comprised between 0.0001 to 0.010% with respect to the overall number of hydroxyl groups of glycolic acid and of the hydroxyacid (A), if present.

The Applicant has surprisingly found that polymer (PGA) as above detailed can be produced using the monomers' ingredients listed above in an efficient manner so as to deliver a thermally stable polymer having melt viscosities ranging from 400 to 800 Paxsec, when measured according to ASTM D4440-08 at a shear rate of 10 sec$^{-1}$ and at a temperature of 260° C.), a viscous/elastic compromise for matching standard thermoplasts (in particular polyesters) behaviour in co-extrusion/co-injection, as expressed by tan δ$_{10\ sec-1}$ values of exceeding 1.5 in the mentioned melt viscosities' range, and measured as above detailed, and acceptable shear thinning, with values of ratio: η$_{1\ sec-1}$/η$_{100\ sec-1}$ below 4.0, whereas: η$_{1\ sec-1}$ is the melt viscosity measured according to ASTM D4440-08 at a shear rate of 1 sec$^{-1}$ and at a temperature of 260° C.; and η$_{100\ sec-1}$ is the melt viscosity measured according to ASTM D4440-08 at a shear rate of 100 sec$^{-1}$ and at a temperature of 260° C.

DESCRIPTION OF EMBODIMENTS

The Polymer (PGA)

Figure 1:
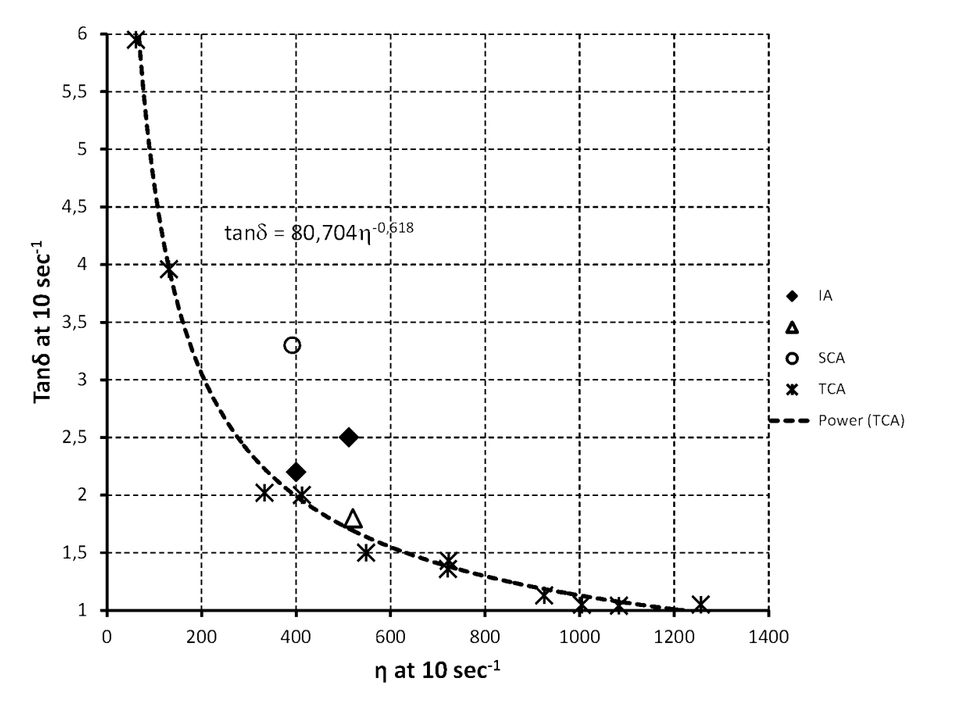
FIG. 1 is a sketch of tan δ (measured according to ASTM D4440-08 at a shear rate of 10 sec$^{-1}$ and at a temperature of 260° C.) as a function of η$_{1\ sec-1}$ (melt viscosity measured according to ASTM D4440-08 at a shear rate of 10 sec$^{-1}$ and at a temperature of 260° C.) (i) for branched PGA of the prior art produced using tricarboallylic acid (TCA) (symbol: *), inclusive of regression curve (tan δ=80.704$\eta_1{}_{sec\text{-}1}{}^{-0.618}$), (ii) for branched PGA including isophthalic acid (IA) according to the invention (symbol: |); and (iii) for branched PGA of comparison including diglycolic acid (DGA) (symbol: Δ) or succinic acid (SCA) (symbol: ○).

The polymer (PGA) of the invention is obtained from polycondensation reaction of a monomer mixture consisting of (i) glycolic acid; (ii) optionally a hydroxyacid (A) (ii) polyol (H); (iii) diacid (AR) and (iv) optionally, monoacid (C), in the amounts specified above.

The polymer (PGA) is hence substantially free from any other unit derived from a monomer different from those listed above, although impurities, defects and chain ends may be present in limited amount, without these significantly affecting the performances of the polymer (PGA).

The polymer (PGA) comprises units derived from polycondensation of notably GA and optionally a hydroxyacid (A), as defined above. The choice of the said hydroxyacid (A) is not limited, and all hydroxyl acids capable of polycondensing, i.e. of forming a macromolecule by condensation (chain addition of monomers with removal of water) can be used. Examples thereof include lactic acid, 3-hydroxybutyric acid, 4-hydroxybutyric acid, 4-hydroxyvaleric acid, 5-hydroxyvaleric acid, 6-hydroxycaproic acid. In general, hydroxyacids (A) that have a primary alcohol are preferred as they are more reactive. With these regards, good results, in particular, can be obtained when the hydroxyacid (A) is lactic acid (LA) (L- or D-isomers, either in racemic mixture or as single isomer).

In one variant of the invention, both GA and the hydroxyacid (A), if present, are bio-sourced, that is to say derived from a natural and renewable raw material, as opposed to a fossil raw material. The use of bio-sourced PGA and, if applicable, hydroxyacids (A), allows the synthesis of "green" polymers, that is to say polymers synthesized from renewable raw material.

When present, the amount of hydroxyacid (A) is of at most 5% moles, generally of at most 4% moles, preferably at most 3% moles; and/or said amount can be as low as 0.1% moles, with respect to the sum of moles of GA and hydroxyacid (A). It is generally understood that the amount of hydroxyacid (A) will be tuned so as to possibly confer certain advantages while not too seriously detrimentally affect the barrier performances which are proper to the PGA polymer structure.

Embodiment's where no additional hydroxyacid (A) is used, in combination with GA, are within the scope of the present invention, and may be preferred from the perspective of maximizing barrier performances.

The choice of polyol (H) is not particularly limited. Polyol (H) can be selected from the group consisting of:
triols, in particularly selected from the group consisting of glycerol, trimethylolpropane, trimethylolbutane, 2,3-di(2'-hydroxyethyl)-cyclohexan-1-ol, hexane-1,2,6-triol, 1,1,1-tris(hydroxymethyl)ethane, 3-(2'-hydroxyethoxy)propane-1,2-diol, 3-(2'-hydroxypropoxy)-propane-1,2-diol, 2-(2'-hydroxyethoxy)-hexane-1,2-diol, 6-(2'hydroxypropoxy)-hexane-1,2-diol, 1,1,1-tris-[(2'-hydroxyethoxy)-methylethane, 1,1,1-tris-[(2'-hydroxypropoxy)-methyl-propane, 1,1,1-tris-(4'-hydroxyphenyl)ethane, 1,1,1-tris-(hydroxyphenyl)-propane, 1,1,5-tris-(hydroxyphenyl)-3-methylpentane, trimethylolpropane ethoxylate, trimethylolpropane propoxylate, tris(hydroxymethyl)aminomethane;
tetraols, in particularly selected from the group consisting of diglycerol, di(trimethylolpropane), pentaerythritol, 1,1,4-tris-(dihydroxyphenyl)-butane;
polyols comprising 5 hydroxyl groups, in particular triglycerol;
polyols comprising 6 hydroxyl groups, in particular dipentaerythritol; and
polyols comprising 8 hydroxyl groups, in particular tripentaerythritol.

Preferred polyols (H) are triols (in particular trimethylolpropane) and tetraols (in particular pentaerythritol), as above detailed, more particularly triols. A polyol (H) which has been found to provide particularly good results within the frame of the present invention is trimethylolpropane.

The polyol (H) is used in an amount such that the number of hydroxyl groups thereof is of at least 0.050%, preferably at least 0.100%, more preferably at least 0.200% and/or of at most 0.750%, preferably of at most 0.650%, more preferably at most 0.600% with respect to the overall number of carboxyl groups of glycolic acid and of the hydroxyacid (A), if present.

An amount of polyol (H) such that the number of hydroxyl groups thereof is of from 0.350 to 0.550% with respect to the overall number of carboxyl groups of glycolic acid and of hydroxyacid (A), if present, has been found particularly useful according to the preferred embodiments of the present invention.

The diacid (AR) comprises two aromatic carboxylic acid groups, that is to say two carboxylic acid groups which are covalently bound to an aromatic carbon atom which is part of the annular structure of the aromatic moiety.

Non limitative examples of acids (AR) are notably phthalic acids, including isophthalic acid (IA), and terephthalic acid (TA), 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, bis(3-carboxyphenoxy)benzene, naphthalene dicarboxylic acids, including 2,6-naphthalene dicarboxylic acid, 2,7-naphthalene dicarboxylic acid, 1,4-naphthalene dicarboxylic acid, 2,3-naphthalene dicarboxylic acid, 1,8-naphthalene dicarboxylic acid.

Phthalic acids are generally preferred.

A diacid (AR) which has been show to provide particularly good results is isophthalic acid, which is hence particularly preferred.

The diacid (AR) is used in an amount such that the number of carboxyl groups thereof is of at least 0.050%, preferably at least 0.100%, more preferably at least 0.200% and/or of at most 0.750%, preferably of at most 0.650%, more preferably at most 0.600% with respect to the overall number of hydroxyl groups of glycolic acid and of the hydroxyacid (A), if present.

An amount of diacid (AR) such that the number of carboxyl groups thereof is of from 0.350 to 0.550% with respect to the overall number of hydroxyl groups of glycolic acid and of hydroxyacid (A), if present, has been found particularly useful according to the preferred embodiments of the present invention.

The choice of the monoacid (C) is not particularly limited; the monoacid (C) may comprise unsaturated double bonds in its hydrocarbon chain; the monoacid (C) is nevertheless preferably an aliphatic acid, that is to say an acid of formula below:

$$R_{Hm}\text{—COOH} \quad \text{(formula C-1)}$$

wherein $R_{Hm}$ is a monovalent aliphatic group having one or more than one carbon atom, in particular having 3 or more carbon atoms.

It is generally understood that better results are obtained with long chain acids, i.e. monoacids (C) wherein the total number of carbon atoms is at least 4, preferably at least 5 more preferably at least 6. Generally the monoacid (C) possesses from 4 to 36 carbon atoms, preferably from 6 to 24 carbon atoms.

Among monoacids (C) which can be advantageously used in the process of the invention, mention can be notably made of caprylic acid [$CH_3(CH_2)_6COOH$], capric acid [$CH_3(CH_2)_8$ COOH], undecanoic acid [$H_3C$—$(CH_2)_9$—COOH], dodecanoic or lauric acid [$H_3C$—$(CH_2)_{10}$—COOH], tridecanoic acid [$H_3C$—$(CH_2)_{11}$—COOH], tetradecanoic or myristic acid [$H_3C$—$(CH_2)_{12}$—COOH], pentadecanoic acid [$H_3C$—$(CH_2)_{13}$—COOH], hexadecanoic or palmitic acid [$H_3C$—$(CH_2)_{14}$—COOH], octadecanoic or stearic acid [$H_3C$—$(CH\ 2)_{16}$—COOH], arachidic acid [$H_3C$—$(CH_2)_{18}$—COOH], and behenic acid [$H_3C$—$(CH_2)_{20}$—COOH].

A monoacid (C) which has been show to provide particularly good results is stearic acid, which is hence particularly preferred.

When present, the amount of monoacid (C) is such that the number of carboxylic acid groups thereof is comprised between 0.0001 to 0.010% with respect to the overall number of hydroxyl groups of glycolic acid and of hydroxyacid (A), if present. Preferably said amount is such that the number of carboxylic acid group of said monoacid (C) is of at least 0.0005%, preferably at least 0.001% with respect to the overall number of hydroxyl groups of glycolic acid and of hydroxyacid (A), if present; and/or at most 0.010%, preferably at most 0.008%, most preferably at most 0.007%, even more preferably at most 0.006% with respect to the overall number of hydroxyl groups of glycolic acid and of hydroxyacid (A), if present.

The polymer (PGA) possesses a melt viscosity ranging from 400 to 800 Pa×sec, when measured according to ASTM D4440-08 at a shear rate of 10 sec$^{-1}$ and at a temperature of 260° C. Preferred polymers (PGA) are those possessing a melt viscosity of at most 800 Pa×sec, preferably at most 750 Pa×sec, more preferably at least 700 Pa×sec.

Polymers (PGA) which have been found to possess particularly advantageous properties are those having melt viscosities of ranging from 500 to 700 Pa×sec, when measured according to ASTM D4440-08 at a shear rate of 10 sec$^{-1}$ and at a temperature of 260° C.

The polymer (PGA) possesses a visco-elastic behaviour such that the following inequality is satisfied:

$$\tan \delta_{10\ sec\text{-}1} \geq 80.704(\eta_{10\ sec\text{-}1})^{-0.618}+0.200 \text{ where:}$$

$\tan \delta_{10\ sec\text{-}1}$ is the ratio of loss modulus (G″) to storage modulus (G′), as measured according to ASTM D4440-08 at a shear rate of 10 sec$^{-1}$ and at a temperature of 260° C.; and $\eta_{10\ sec\text{-}1}$ is the melt viscosity, as measured according to ASTM D4440-08 at a shear rate of 10 sec$^{-1}$ and at a temperature of 260° C.

Advantageously, hence, the polymer (PGA) has a tan $\delta_{10\ sec\text{-}1}$ in the domain of melt viscosities $\eta_{10\ sec\text{-}1}$ of 500 to 700 Pa×sec, when determined at according to ASTM D4440-08 at a shear rate of 10 sec$^{-1}$ and at a temperature of 260° C., of exceeding 1.5, preferably of exceeding 1.8, more preferably of exceeding 2.0.

The polymer (PGA) possesses a shear thinning such that the ratio:

$$\eta_{1\ sec\text{-}1}/\eta_{100\ sec\text{-}1}$$

whereas:

$\eta_{1\ sec\text{-}1}$ is the melt viscosity measured according to ASTM D4440-08 at a shear rate of 1 sec$^{-1}$ and at a temperature of 260° C.; and $\eta_{100\ sec\text{-}1}$ is the melt viscosity measured according to ASTM D4440-08 at a shear rate of 100 sec$^{-1}$ and at a temperature of 260° C., is of less than 4.2, preferably of less than 4.0. Lower boundary for the ratio:

$\eta_{1\ sec\text{-}1}/\eta_{100\ sec\text{-}1}$ is not particularly limited; it is generally understood that the polymer (PGA) will have a ratio $\eta_{1\ sec\text{-}1}/\eta_{100\ sec\text{-}1}$ of at least 1.0, preferably at least 2.0.

The invention further pertains to a method of making the polymer (PGA) as above detailed, said method comprising polycondensing glycolic acid (GA), optionally hydroxyacid (A), polyol (H), diacid (AR) and optionally monoacid (C), as above detailed.

In the method of the present invention, a polycondensation catalyst may optionally be added to the monomer mixture. Such a catalyst is usually added in an amount of about 0.01 to 2 mol %, in particular of about 0.1 to 1 mol % with respect to the total moles of the monomers of the monomer mixtures. Such polycondensation catalysts are well known to a person skilled in the art and may be selected, for example, from tin (II) chloride, stannous octoate, zinc acetate, zinc lactate and methanesulfonic acid, methanesulfonic acid being preferred.

Preferably, the step of polycondensing is carried out at least partly at a temperature such that the monomers' mixture and the formed growing polymer are in the molten phase. Generally, after a step of polycondensing in the molten state, providing for a pre-polymer possibly comprising unreacted GA, hydroxyacid (A) (when present), polyol (H), diacid (AR) and monoacid (C) (when present), polycondensation is then pursued at a temperature such that the pre-polymer is in the solid state (this step will be referred hereunder as solid statepolymerization or SSP).

Hence, the method of the invention generally includes a first step of polymerization in the molten state to form a pre-polymer and a second step of solid state polymerization (SSP) for increasing molecular weight of the pre-polymer.

In the first step, the temperature is selected so as to maintain the monomer mixture and, with the progress of the reaction, the formed pre-polymer, in the molten state.

Generally, the first step of polycondensation in the molten state is accomplished under stirring, by maintaining the reaction mixture at temperatures ranging from 160 to 240° C.; the temperature may be kept constant during this first step, or can be varied and maintained at more than one temperature plateau. According to the present invention, the expression "temperature plateau" means that the temperature is kept substantially constant for at least 5 minutes.

In the method of the present invention, the pre-polymer, possibly comprising residual monomers, as above detailed, obtained from first step of polymerization in the molten state undergoes a step of solidification and size reduction, so as to provide particulate pre-polymer material in the form of loose particles.

The particulate pre-polymer may be processed from the molten state under the form of pearls or pellets through standard techniques of pelletization and/or pastillation, or can be recovered as solidified crumbs and milled so as to provide powder.

Techniques of pelletization are generally based on extrusion, whereas the molten pre-polymer, possibly comprising residual monomers, as above detailed, is forced, possibly using a gear pump, through a die generally comprising a plurality of holes generating strands of material, which are then cut by an appropriate cutting system (e.g. a rotating blade) in the form of cylinders of given length and solidified by cooling.

Techniques of pastillation includes supplying with molten pre-polymer, possibly comprising residual monomers, as above detailed, from a vessel, pit or supply pipe system, to a drop-forming device, depositing drops of the molten pre-polymer on a conveyor belt, whereas droplets solidify in the form of pastilles having size ranging e.g. from 1 to 25 mm in diameter.

When recovering pre-polymer, possibly comprising residual monomers, as above detailed, by solidification under the form of crumbs, a milling step is required. Such a milling step may be carried out by any means known to a person skilled in the art, for example by milling in a high-speed grinder or in a rotary mill such as the Pulverisette® from FRITSCH.

The SSP step may take place by exposing the pre-polymer, possibly comprising residual monomers, as above detailed, in its solid state, either under vacuum or under an inert gas atmosphere (e.g. under nitrogen), for one or more hours or even several days, at a temperature above the glass transition temperature of the said pre-polymer, possibly comprising residual monomers, as above detailed, but below its melting temperature. Typically, such a SSP step may be carried out at a temperature of 140 to 240° C., in particular of 150 to 230° C., for example at around 170-220° C. and at a pressure below 10 mbar. Depending on the nature of the residual monomer(s) in the pre-polymer, on their proportions and on the target final viscosity/molecular weight, on the temperature and on the pressure during the overall polycondensation step, the duration of the SSP step may be a few hours to 1 week, in particular from 6 to 200 h, for example of about 10 to 150 h.

Preferably, the polycondensation reaction in the molten phase takes place under vacuum in order to evaporate the water of reaction and prevent the latter from hydrolyzing the polymer chains being formed. Very particularly preferably, polycondensation reaction in the molten phase is initiated at atmospheric pressure and the vacuum is applied gradually until a pressure of the order of a few mbar, in particular less than 10 mbar, for example from 2 to 8 mbar, is achieved. The SSP step is typically carried out at a pressure of about 0.01 to 10 mbar, in particular of 0.05 to 5 mbar, for example of about 0.1 mbar.

In the method of the present invention, an antioxidant may optionally be added to the reaction medium. Preferably, such an antioxidant is added between the molten phase polycondensation step and the SPP step. Such an antioxidant is typically added in an amount of about 0.01 to 1% by weight, in particular of about 0.1 to 0.5% by weight of the monomer mixture. Such antioxidants are well known to a person skilled in the art and may be selected, for example, from hindered phenols and hindered phosphites. Bis(2,4-di-t-butylphenyl)pentaerythritol diphosphite sold under the name ULTRANOX 626® by CHEMTURA, bis(2,6-di-t-butyl-4-methylphenyl)pentaerythritol diphosphite sold under the name ADK STAB PEP 36® by ADEKA PALMAROLE, and those sold under the name DOVERPHOS® are particularly preferred.

Still, the invention pertains to a composition (C) comprising polymer (PGA) and at least one additional ingredient. Generally, the composition comprises a major amount of polymer (PGA) and a minor amount of any other additional ingredient, as above mentioned. The said ingredient may be notably selected from anti-oxidants, thermal stabilizers, buffers, UV and light stabilizers, pigments, lubricants, processing aids. It is also possible for the composition (C) to include one or more than one additional glycolic acid polymers different from polymer (PGA) as above detailed. For instance, the inventive polymer (PGA) may be admixed with linear PGA polymer obtained from ring-opening polycondensation of glycolic acid in the absence of any polyfunctional modifying monomer, or may be admixed with another branched glycolic acid-based polymer different from the polymer (PGA) of the present invention, manufactured using modifying monomers different from the aromatic diacid of the present invention.

The amount of the said ingredient(s) is generally comprised between 0.01 to 40% wt, preferably between 0.1 and 35% wt, with respect to the total weight of the composition (C). for embodiment's wherein the composition (C) comprising polymer (PGA) is not comprising any additional glycolic acid polymer different from polymer (PGA) of the invention, the additional ingredients, as listed above, are generally comprised in an amount of 0.01 to 40% wt, preferably between 0.1 and 35% wt, with respect to the total weight of the composition (C).

The invention further pertains to a method for producing a multilayer stretched product, said method comprising:
(i) forming a multi-layer resin laminate including at least one layer of polymer (PGA) as above detailed or of composition (C) comprising the same, as above detailed, and at least one layer of a thermoplast different from the polymer (PGA), by processing from the melt;
(ii) stretching the multi-layer resin laminate, so as to produce the multi-layer stretched product.

The choice of thermoplast is not particularly limited, provided that it can be laminated with a layer made of the polymer (PGA) or of the composition comprising the same.

Preferred examples of such thermoplast may include: Polyester resins, such as polyethylene terephthalate and polyethylene naphthalate, polystyrene resins, acrylic acid or methacrylic acid resins, nylon resins, sulfide resins such as polyphenylene sulfide, and polycarbonate resins. Among these, it is preferred to use a polyester resin, particularly an aromatic polyester resin composed of a diol component and a dicarboxylic acid component, of which at least one, particularly the dicarboxylic acid component, is an aromatic one, in order to provide a multilayer product which satisfies transparency and gas-barrier property in combination depending on the use thereof. Polyethylene terephthalate (PET) is particularly preferred.

The multilayer resin laminate can be of any shape or form; it can be notably under the form of a tubular laminate, e.g. a parison, a flat laminate or a shaped container.

A preferred example of the multilayer resin laminate is a bottle pre-form, including a threaded end and a closed-ended cylindrically shaped body.

The step of forming the said resin laminate can be performed by whichever technique involving processing the polymer (PGA) or the composition comprising the same and the thermoplast, while these are in the molten state.

Suitable preferred techniques are co-extrusion molding, and co-injection molding.

According the co-extrusion molding techniques, molten flows of the polymer (PGA) or the composition comprising the same and of the thermoplast are generated in dedicated screw extruders, and fed to a multiple slot die for providing the multilayer resin laminate.

In injection molding technique, molten shots of the polymer (PGA) or the composition comprising the same and of the thermoplast are injected in the same mold through a multi-shot nozzle.

In the step (ii), the multi-layer resin laminate is stretched, generally at a temperature enabling plastic deformation, generally beyond melting point.

According to certain embodiment's, the multi-layer resin laminate is cooled and solidified after step (i) before undergoing step (ii). In this case, step (ii) includes a step of re-heating the multi-layer laminate to a temperature which is above the glass transition temperature of the polymer (PGA) and the thermoplast, and the multi-layer laminate is stretched while heated. Stretching can be achieved by blowing a pressurized gas, typically air; the stretching step may be performed within a mould forcing the multi-layer stretched product to adhere to a well-determined geometry.

According to other embodiment's, the multi-layer resin laminate is submitted to step (ii) without any intermediary cooling and re-heating step.

According to certain embodiment's of this variant, an extruded multi-layer resin laminate e.g. under the form of a parison can be blown using compressed air, while in the molten phase, directly as extruded from the die.

According to certain embodiment's of this variant, an extruded multi-layer resin laminate e.g. under the form of a film can be stretched, e.g. mono-axially or bi-axially stretched using suitable stretching means operating in the machine and/or in the traverse directions.

According to these embodiment's, the multilayer stretched product can be notably a multilayer blown film (stretched in the molten phase), a multilayer cast film or a multilayer shrink film manufactured by double bubble process.

Should the disclosure of any patents, patent applications, and publications which are incorporated herein by reference conflict with the description of the present application to the extent that it may render a term unclear, the present description shall take precedence. The invention will be now be described in more detail with reference to the following examples, whose purpose is merely illustrative and not intended to limit the scope of the invention.

Determination of Melt Viscosity and Related Properties

Melt viscosity of samples was determined using a parallel plate rheometer according to ASTM D4440-08, at a temperature of 260° C., operating at a variable shear rate ranging from 1 to 100 sec$^{-1}$. The instrument used was a 25 mm diameter parallel plate rheometer available as DHR3 from TA Instruments.

Preparation of Polymers (PGA) Including Isophthalic Acid

Example 1—Preparation of Polymer with IA

1 L Kettle equipped with heater, condenser, temperature sensor and, mechanical stirrer was charged with 750 g glycolic acid (GA; 9.862 mole, taken as 1.0000 mol basis), 3.441 g of isophthalic acid (ISA; 0.0207 mole, 0.0021 mol per mol of GA), 1.852 g of trimethylolpropane (TMP; 0.0138 mole, 0.0014 mol per mol of GA), 0.075 g of stearic acid (SA; 100 ppm, 0.000264 mole, 0.000027 mol per mol of GA), 2.25 g of methanesulfonic acid (MSA; 0.0234 mole, 0.0024 mol per mol of GA), and 0.0375 g of DOVERPHOS® 9228 phosphite additive (50 ppm P). The reaction mass was heated under a steady nitrogen flow to melt glycolic acid and continued to heat gradually with mechanical stirring until all solid melted. When the temperature reached 110° C., nitrogen flow was increased and a reduced pressure of 150-200 Torr was maintained. Under nitrogen inert atmosphere at reduced pressure, as above specified, the temperature of the reaction was maintained at 110° C. to remove water. Water removal was continued by gradually raising the temperature to 230° C. while maintaining pressure at set-point value of 150 Torr. The reaction mass was allowed to stand at this temperature and pressure for 60 minutes. Then, the pressure was further reduced to 50 Torr and the reaction was continued. After about 150 minutes, the heating was stopped and the reaction mass was allowed to cool to room temperature under a steady flow of nitrogen at atmospheric pressure. Upon cooling to room temperature, the hard solidified PGA mass was taken out and weighed. Crude yield: 539 g (~93%). The mass was then crushed into small pieces using a hammer, and powdered into small particles with less than 2 mm diameter using a high speed grinder and classified through a 2 mm sieve. The resultant polymer was further sieved to get rid of particles with less than 0.5 mm diameter. The powder so-obtained was transferred into a round-bottom flask and attached into a rotary evaporator system for uniform mixing and further polymerized in the solid state using an oil bath maintained at 218° C. under a constant nitrogen stream of 1.1 L/min. The heating was stopped periodically and a specimen of reduced quantity of the polymer was carefully taken out to analyze the melt viscosity using a parallel plate rheometer, at different times of solid state polymerization (SSP). After achieving the desired melt viscosity, the heating was stopped and the SSP was arrested.

After 53 hours of SSP at 218° C., 314 g of a PGA polymer having a melt viscosity of 512 Paxsec at a shear rate of 10 sec$^{-1}$ was obtained.

Example 2—Preparation of Polymer with IA

A polymer (PGA) was prepared in a manner similar to the procedure described for Ex. 1, except that reaction was carried out in a 5 L reactor kettle, and using 1500 g glycolic acid (GA; 19.724 mole, taken as 1.0000 mol basis), 4.587 g of isophthalic acid (ISA; 0.0276 mole, 0.0014 mol per mol of GA), 3.705 g of trimethylolpropane (TMP; 0.0276 mole, 0.0014 mol per mol of GA), 0.150 g of stearic acid (SA; 100 ppm, 0.000528 mole, 0.000027 mol per mol of GA), 4.5 g of methanesulfonic acid (MSA; 0.0468 mole, 0.0024 mol per mol of GA), and 0.075 g of DOVERPHOS® 9228 phosphite additive (50 ppm P).

After 96 hours of SSP at 218° C., 351 g of a PGA polymer having a melt viscosity of 400 Paxsec at 10 sec$^{-1}$ was obtained Examples of Comparison: Preparation of Polymers (PGA) Including Tricar Ballylic Acid (TCA), Diglycolic Acid (DGA) or Succinic Acid (SCA)

Comparative Example 3: Preparation of Polymer with TCA

5 L reactor equipped with heater, condenser, temperature sensor and, mechanical stirrer was charged with 1500 g glycolic acid (GA; 19.724 mole, taken as 1.0000 mol basis), 4.863 g of tricarballylic acid (TCA; 0.0276 mole, 0.0014 mol per mol of GA), 3.705 g of trimethylolpropane (TMP; 0.0276 mole, 0.0014 mol per mol of GA), 0.150 g of stearic acid (SA; 100 ppm, 0.000528 mole, 0.000027 mol per mol of GA), 4.5 g of methanesulfonic acid (MSA; 0.0468 mole, 0.0024 mol per mol of GA), and 0.075 g of DOVERPHOS® 9228 phosphite additive (50 ppm P). The reaction mass was heated under a steady nitrogen flow to melt glycolic acid and continued to heat gradually with mechanical stirring until the entire solid melted. When the temperature reached 110'C, nitrogen flow was increased and a reduced pressure of 150-200 Torr was maintained. At this inert atmosphere of reduced pressure filled with nitrogen, the temperature of the reaction was maintained at 110° C. to remove water. Water removal was continued by gradually raising the temperature to 230° C. and with pressure constant at 150 Torr. The reaction mass was allowed to stand at this temperature and pressure for 60 minutes. Then, the pressure was further reduced to 50 Torr and the reaction was continued. After about 150 minutes, the heating was stopped and the reaction mass was drained in a steel plate. The PGA mass was allowed to cool to room temperature under a steady flow of nitrogen at atmospheric pressure. Upon cooling to room temperature, the hard solidified PGA mass was weighed, and provided for a crude yield: 1076 g (~93%). The mass was then crushed into small pieces using a grinder, and extruded using a small twin-screw extruder (ZSK 26, made by Coperion), equipped with a 3 mm diameter nozzle, into a strand at a temperature of about 190° C. to about 210° C., which was cooled and chopped into pellets. These pellets were transferred into a round-bottom flask and attached into a rotary evaporator system for uniform mixing, and polymerization was pursued in the solid state, using an oil bath maintained at 218° C. under a constant nitrogen stream of 1.1 L/min. The heating was stopped periodically and a specimen of reduced quantity of the polymer was carefully taken out to analyze the melt viscosity using a parallel plate rheometer, at different times of solid state polymerization (SSP). After achieving the desired melt viscosity, the heating was stopped and the SSP was arrested.

After 50 hours of SSP at 218° C., 626 g of a PGA polymer having a melt viscosity of 721 Pa×sec at 10 sec$^{-1}$ was obtained.

Comparative Example 4—Preparation of Polymer with DGA

5 L reactor equipped with heater, condenser, temperature sensor and, mechanical stirrer was charged with 1500 g glycolic acid (GA; 19.724 mole, taken as 1.0000 mol basis), 5.554 g of diglycolic acid (DGA; 0.0414 mole, 0.0021 mol per mol of GA), 3.705 g of trimethylolpropane (TMP; 0.0276 mole, 0.0014 mol per mol of GA), 30 g of lactic acid (LA; 0.333 mole, 0.01688 mol per mol of GA), 0.150 g of stearic acid (SA; 100 ppm, 0.000528 mole, 0.000027 mol per mol of GA), 4.5 g of methanesulfonic acid (MSA; 0.0468 mole, 0.0024 mol per mol of GA), and 0.075 g of DOVERPHOS® 9228 phosphite additive (50 ppm P). The reaction mass was heated under a steady nitrogen flow to melt glycolic acid and continued to heat gradually with mechanical stirring until the entire solid melted. When the temperature reached 110° C., nitrogen flow was increased and a reduced pressure of 150-200 Torr was maintained. At this inert atmosphere of reduced pressure filled with nitrogen, the temperature of the reaction was maintained at 110° C. to remove water. Water removal was continued by gradually raising the temperature to 230° C. and with pressure constant at 150 Torr. The reaction mass was allowed to stand at this temperature and pressure for 60 minutes. Then, the pressure was further reduced to 50 Torr and the reaction was continued. After about 150 minutes, the heating was stopped and the reaction mass was drained in a steel plate. The PGA mass was allowed to cool to room temperature under a steady flow of nitrogen at atmospheric pressure. Upon cooling to room temperature, the hard solidified PGA mass was weighed, yielding a crude yield of 1100 g (~93%). The mass was then crushed into small pieces using a grinder, and extruded, using a small twin-screw extruder (ZSK 26, made by Coperion), equipped with a 3 mm diameter nozzle, into a strand at a temperature of about 190° C. to about 210° C., which after cooling at room temperature, was chopped into pellets. 200 g of these pellets were transferred into a round-bottom flask and attached into a rotary evaporator system and polymerized in the solid state using an oil bath maintained at 217° C. under a constant nitrogen stream of 1.1 L/min. The heating was stopped periodically and the small quantity of the polymer was carefully taken out to analyse the melt viscosity using a parallel plate rheometer at different times of solid state polymerization (SSP). After achieving the desired melt viscosity, the heating was stopped and the SSP was arrested.

After 80 hours of SSP at 218° C., 186 g of a PGA polymer having a melt viscosity of 520 Pa×sec at a shear rate of 10 sec$^{-1}$ was obtained.

Comparative Example 5—Preparation of Polymer with SCA

Same procedure as in Example 1 was repeated, except that the following amounts of succinic acid (SCA) was used instead of isophthalic acid: SCA (2.446 g; 0.0207 mole, 0.0021 mol per mol of GA).

Succinic acid was found to boil off from the reaction mixture. A quantitative HPLC analysis of the water generated during melt phase reaction enabled estimating the amount of succinic acid leaching out of the reaction mixture as approximately 130 ppm, so that the branched polymer therefrom would comprise lower amount of succinic acid. As a consequence, notably, the effectiveness of solid state polymerization is reduced.

After 53 hours of SSP at 218° C., 313 g of a PGA polymer having a melt viscosity of 392 Pa×sec at a shear rate of 10 sec$^{-1}$ was obtained. It is noticeable mentioning that under same conditions, Ex. 1 using IA was found to provide a $\eta_{10\ sec-1}$ of about 100 Pa×sec higher.

TABLE 1

| Run | diacid nature | COOH$_{diacid}$/ OH$_{GA}$ (% mol) | $\eta_{10\ sec-1}$ (Pa × sec) | tan$\delta_{10\ sec-1}$ | $\eta_{1\ sec-1}$/ $\eta_{100\ sec-1}$ |
|---|---|---|---|---|---|
| Ex. 1 | IA | 0.42% | 512 | 2.5 | 3.0 |
| Ex. 2 | IA | 0.28% | 400 | 2.2 | 3.3 |
| Ex. 3C(*) | TCA | 0.42% | 721 | 1.4 | 6.5 |
| Ex. 4C | DGA | 0.42% | 520 | 1.8 | 4.4 |
| Ex. 5C | SCA | 0.42% | 392 | 3.3 | 2.4 |

(*)in this case, the notation "diacid" is to be read as in connection with the multifunctional tricarballylic acid used as comparison.

TABLE 2

| Run | tan$\delta_{10\ sec-1}$ | tan$\delta_{theoretical}$ (*) | $\Delta$tan$\delta_{10\ sec-1}$ (#) |
|---|---|---|---|
| Ex. 1 | 2.5 | 1.71 | 0.79 |
| Ex. 2 | 2.3 | 1.99 | 0.21 |
| Ex. 3C | 1.4 | 1.38 | <0.05 |

TABLE 2-continued

| Run | $\tan\delta_{10\ sec-1}$ | $\tan\delta_{theoretical}$ (*) | $\Delta\tan\delta_{10\ sec-1}$ (#) |
|---|---|---|---|
| Ex. 4C | 1.8 | 1.69 | 0.11 |
| Ex. 5C | 3.3 | 2.01 | 1.29 |

(*) $\tan\delta_{theoretical}$: theoretical value of $\tan\delta$ as estimated for branched PGA of the prior art according to the formula: $\tan\delta_{theoretical} = 80.704(\eta_{10\ sec-1}) - 0.618$;
(#) $\Delta\tan\delta_{10\ sec-1}$: difference between actual $\tan\delta_{10\ sec-1}$ and $\tan\delta_{theoretical}$.

Thermal stabilities of polymer (PGA) of Example 1 and Comparative Example 5 were compared through TGA determinations. Results are summarized in the following table:

TABLE 3

| Run | 10% degradation (° C.) | Max. degradation (° C.) |
|---|---|---|
| Ex. 1 | 340 | 404 |
| Ex. 5C | 321 | 363 |

From above-reproduced data, it is clear that the branched PGA polymer of the present invention possesses improved thermal stability over corresponding polymers possessing recurring units derived from aliphatic dicarboxylic acid.

The invention claimed is:

1. A glycolic acid polymer (PGA), said polymer (PGA) being obtained from polycondensation reaction of a monomer mixture consisting of:
   (i) glycolic acid (GA);
   (ii) optionally, at least one hydroxyacid (A), wherein hydroxyacid (A) is at least one hydroxyl acid having only one hydroxyl group and only one carboxylic acid group different from glycolic acid (GA), wherein the molar amount of hydroxyacid (A) is of at most 5% moles, with respect to the sum of moles of glycolic acid (GA) and hydroxyacid (A);
   (iii) at least one polyol (H) comprising at least three hydroxyl groups and being free from carboxylic acid group;
   (iv) at least one diacid (AR), wherein diacid (AR) is at least one aromatic diacid comprising two aromatic carboxylic acid groups and being free from hydroxyl groups selected from the group consisting of phthalic acid, isophthalic acid, and terephthalic acid; and
   (v) at least one monoacid (C), wherein monoacid (C) is at least one carboxylic acid having one carboxylic acid group and being free from hydroxyl group, wherein:
   the amount of polyol (H) is such that the number of hydroxyl groups thereof is comprised between 0.050 to 0.750% with respect to the overall number of carboxyl groups of glycolic acid and of the hydroxyacid (A), if present;
   the amount of diacid (AR) is such that the number of carboxylic acid groups thereof is comprised between 0.050 to 0.750% with respect to the overall number of hydroxyl groups of glycolic acid and of the hydroxyacid (A), if present;
   the amount of said monoacid (C) is such that the number of carboxylic acid groups thereof is comprised between 0.0001 to 0.010% with respect to the overall number of hydroxyl groups of glycolic acid and of the hydroxyacid (A), if present,
   wherein polycondensation includes a first step of polymerization in the molten state to form a pre-polymer and a second step of solid state polymerization for increasing molecular weight of the pre-polymer,
   wherein the polymer (PGA) possesses a melt viscosity ranging from 400 to 800 Paxsec, when measured according to ASTM D4440-08 at a shear rate of 10 sec$^{-1}$ and at a temperature of 260° C., and
   wherein the polymer (PGA) possesses a thermal stability characterized by at most 10% degradation by weight at a temperature of at least 340° C. as measured using thermogravimetric analysis (TGA).

2. The polymer (PGA) of claim 1 wherein hydroxyacid (A) is selected from the group consisting of lactic acid, 3-hydroxybutyric acid, 4-hydroxybutyric acid, 4-hydroxyvaleric acid, 5-hydroxyvaleric acid, and 6-hydroxycaproic acid, and/or wherein the hydroxyacid (A) is present in an amount of hydroxyacid (A) of at most 5% moles, with respect to the sum of moles of glycolic acid (GA) and of hydroxyacid (A).

3. The polymer (PGA) of claim 1, wherein polyol (H) is selected from the group consisting of:
   triols;
   tetraols;
   polyols comprising 5 hydroxyl groups;
   polyols comprising 6 hydroxyl groups; and
   polyols comprising 8 hydroxyl groups; and/or wherein the polyol (H) is used in an amount such that the number of hydroxyl groups thereof is of at least 0.050% and/or of at most 0.750% with respect to the number of hydroxyl groups of glycolic acid.

4. The polymer (PGA) according to claim 1, wherein the diacid (AR) is used in an amount such that the number of carboxyl groups thereof is of at least 0.050% and/or of at most 0.750% with respect to the overall number of hydroxyl groups of glycolic acid and of hydroxyacid (A), if present.

5. The polymer (PGA) according to claim 1, wherein monoacid (C) is an aliphatic acid of formula: $R_{Hm}$—COOH (formula C-1) wherein $R_{Hm}$ is a monovalent aliphatic group having one or more than one carbon atom.

6. The polymer (PGA) according to claim 1, said polymer (PGA) possessing a visco-elastic behaviour such that the polymer (PGA) has a tan $\delta$10 sec-1 in the domain of melt viscosities $\eta$10 sec$^{-1}$ of 500 to 700 Paxsec, of exceeding 1.5 where: tan $\delta_{10\ sec-1}$ is the ratio of loss modulus (G") to storage modulus (G'), as measured according to ASTM D4440-08 at a shear rate of 10 sec-1 and at a temperature of 260° C.; and $\eta_{10\ sec-1}$ is the melt viscosity, as measured according to ASTM D4440-08 at a shear rate of 10 sec$^{-1}$ and at a temperature of 260° C.

7. The polymer (PGA) according to claim 1, said polymer (PGA) possessing a shear thinning such that the ratio:
   $\eta$1 sec-1/$\eta$100 sec-1
   wherein whereas:
   $\eta$1 sec-1 is the melt viscosity measured according to ASTM D4440-08 at a shear rate of 1 sec-1 and at a temperature of 260° C.; and
   $\eta$100 sec-1 is the melt viscosity measured according to ASTM D4440-08 at a shear rate of 100 sec-1 and at a temperature of 260° C.,
   is of less than 4.2.

8. A method of making the polymer (PGA) according to claim 1, said method comprising polycondensing glycolic acid (GA), optionally hydroxyacid (A), polyol (H), diacid (AR) and monoacid (C).

9. The method of claim 8, wherein the method includes polymerization in the molten state to form a pre-polymer and solid state polymerization (SSP) of the pre-polymer for increasing molecular weight of the pre-polymer.

10. A composition (C) comprising polymer (PGA) according to claim 1 and at least one additional ingredient selected from anti-oxidants, thermal stabilizers, buffers, UV and light stabilizers, pigments, lubricants, processing aids or one or more than one additional glycolic acid polymers different from polymer (PGA).

11. A method for producing a multilayer stretched product, said method comprising:
    (i) forming a multi-layer resin laminate including at least one layer of polymer (PGA) according to claim 1, and at least one layer of a thermoplast different from the polymer (PGA), by processing from the melt;
    (ii) stretching the multi-layer resin laminate, so as to produce the multi-layer stretched product.

12. The method of claim 11, wherein the thermoplast is selected from the group consisting of polyester resins; polystyrene resins; acrylic acid or methacrylic acid ester resins; nylon resins; sulfide resins; and polycarbonate resins.

13. The method of claim 11, wherein forming the said resin laminate is performed by a technique selected from co-extrusion molding, or co-injection molding.

14. The method of claim 11, wherein the multi-layer resin laminate is cooled and solidified after (i) before undergoing (ii).

15. The polymer (PGA) of claim 2, wherein hydroxyacid (A) is lactic acid (LA) as the L-isomer, the D-isomer, or in racemic mixture thereof.

16. The polymer (PGA) of claim 3, wherein polyol (H) is at least one compound selected from the group consisting of glycerol, trimethylolpropane, trimethylolbutane, 2,3-di(2'-hydroxyethyl)-cyclohexan-1-ol, hexane-1,2,6-triol, 1,1,1-tris(hydroxymethyl)ethane, 3-(2'-hydroxyethoxy)propane-1,2-diol, 3-(2'-hydroxypropoxy)-propane-1,2-diol, 2-(2'-hydroxyethoxy)-hexane-1,2-diol, 6-(2'hydroxypropoxy)-hexane-1,2-diol, 1,1,1-tris-[(2'-hydroxyethoxy)-methylethane, 1,1,1-tris-[(2'-hydroxypropoxy)-methylpropane, 1,1,1-tris-(4'-hydroxyphenyl)ethane, 1,1,1-tris-(hydroxyphenyl)-propane, 1,1,5-tris-(hydroxyphenyl)-3-methylpentane, trimethylolpropane ethoxylate, trimethylolpropane propoxylate, tris(hydroxymethyl)aminomethane, diglycerol, di(trimethylolpropane), pentaerythritol, 1,1,4-tris-(dihydroxyphenyl)-butane, triglycerol, dipentaerythritol and tripentaerythritol.

17. The polymer (PGA) according to claim 5, wherein monoacid (C) is at least one acid selected from the group consisting of caprylic acid [$CH_3(CH_2)_6COOH$], capric acid [$CH_3(CH_2)_8COOH$], undecanoic acid [$H_3C—(CH_2)_9—COOH$], dodecanoic or lauric acid [$H_3C—(CH_2)_{10}—COOH$], tridecanoic acid [$H_3C—(CH_2)_{11}—COOH$], tetradecanoic or myristic acid [$H_3C—(CH_2)_{12}—COOH$], pentadecanoic acid [$H_3C—(CH_2)_{13}—COOH$], hexadecanoic or palmitic acid [$H_3C—(CH_2)_{14}—COOH$], octadecanoic or stearic acid [$H_3C—(CH_2)_{16}—COOH$], arachidic acid [$H_3C—(CH_2)_{18}—COOH$], and behenic acid [$H_3C—(CH_2)_{20}—COOH$].

\* \* \* \* \*